(12) United States Patent
Sommers et al.

(10) Patent No.: US 11,093,376 B2
(45) Date of Patent: Aug. 17, 2021

(54) METHODS, SYSTEMS, AND COMPUTER READABLE MEDIA FOR CONFIGURING A TEST SYSTEM USING SOURCE CODE OF A DEVICE BEING TESTED

(71) Applicant: Keysight Technologies, Inc., Santa Rosa, CA (US)

(72) Inventors: Christian Paul Sommers, Bangor, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 158 days.

(21) Appl. No.: 16/446,318

(22) Filed: Jun. 19, 2019

(65) Prior Publication Data

US 2020/0401504 A1    Dec. 24, 2020

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01); *G06F 11/3688* (2013.01)

(58) Field of Classification Search
CPC ............. G06F 11/3684; G06F 11/3664; G06F 11/3688
See application file for complete search history.

(56) References Cited

U.S. PATENT DOCUMENTS

| | | | |
|---|---|---|---|
| 7,272,822 B1 | 9/2007 | Riggins et al. | |
| 8,028,276 B1 | 9/2011 | Bessonov | |
| 8,402,435 B1 | 3/2013 | Spiro | |
| 9,582,620 B1 | 2/2017 | Segal et al. | |
| 9,891,898 B1 | 2/2018 | Tonsing | |
| 10,164,829 B1 | 12/2018 | Watson et al. | |
| 10,225,381 B1 | 3/2019 | Bosshart | |
| 10,581,491 B2 | 3/2020 | Won et al. | |

(Continued)

FOREIGN PATENT DOCUMENTS

| | | |
|---|---|---|
| CN | 107749802 A | 3/2018 |
| CN | 110719212 A | 1/2020 |

OTHER PUBLICATIONS

Keysight Technologies, Keysight Test Automation Platform, 2017, 52 pages (Year: 2017).*

(Continued)

*Primary Examiner* — Katherine Lin

(57) ABSTRACT

Methods, systems, and computer readable media for configuring a test system using source code of a device being tested are disclosed. According to one method, the method occurs at a network equipment test device. The method includes receiving one or more device source files associated with a device under test (DUT); analyzing the one or more device source files to determine configuration source code for configuring at least one test system resource in the network equipment test device, wherein analyzing the one or more device source files includes identifying functionality of the DUT based on device source code portions and determining, using the device source code portions, the configuration source code for testing the functionality of the DUT; configuring, using the configuration source code, the at least one test system resource; and testing the DUT using the at least one test system resource.

16 Claims, 9 Drawing Sheets

(56) References Cited

U.S. PATENT DOCUMENTS

| | | | |
|---|---|---|---|
| 10,686,671 | B1 | 6/2020 | Mozumdar et al. |
| 10,733,088 | B1 | 8/2020 | Sommers |
| 10,868,730 | B2 | 12/2020 | Mozumdar et al. |
| 10,880,197 | B2 | 12/2020 | Naskar et al. |
| 2006/0168205 | A1 | 7/2006 | Barron et al. |
| 2006/0259629 | A1 | 11/2006 | Usmani et al. |
| 2009/0112505 | A1 | 4/2009 | Engel et al. |
| 2011/0145649 | A1* | 6/2011 | Nilsson ............... G06F 11/3688 714/38.1 |
| 2011/0183613 | A1 | 7/2011 | Nocera |
| 2012/0033678 | A1 | 2/2012 | Page et al. |
| 2013/0152047 | A1 | 6/2013 | Moorthi et al. |
| 2014/0157245 | A1 | 6/2014 | Krueger |
| 2015/0088827 | A1 | 3/2015 | Xu et al. |
| 2015/0172208 | A1 | 6/2015 | DeCusatis et al. |
| 2015/0234725 | A1 | 8/2015 | Cillis et al. |
| 2015/0365325 | A1 | 12/2015 | Hwang et al. |
| 2016/0234087 | A1 | 8/2016 | Nyerges et al. |
| 2017/0093986 | A1 | 3/2017 | Kim et al. |
| 2017/0237632 | A1 | 8/2017 | Hegde et al. |
| 2017/0322873 | A1 | 11/2017 | Morris |
| 2018/0210823 | A1 | 7/2018 | Vorganti |
| 2018/0255027 | A1 | 9/2018 | Winig et al. |
| 2018/0316608 | A1 | 11/2018 | Dowlatkhah et al. |
| 2019/0014395 | A1 | 1/2019 | Anand et al. |
| 2019/0065349 | A1 | 2/2019 | Sharma et al. |
| 2019/0199654 | A1 | 6/2019 | Pope et al. |
| 2019/0222481 | A1 | 7/2019 | Hira |
| 2019/0260682 | A1 | 8/2019 | Ewert |
| 2019/0379588 | A1 | 12/2019 | Rao |
| 2020/0021512 | A1 | 1/2020 | Naskar et al. |
| 2020/0267059 | A1 | 8/2020 | Mozumdar et al. |

OTHER PUBLICATIONS

Non-Final Office Action for U.S. Appl. No. 16/181,309 (dated Oct. 28, 2019).
Advisory Action and AFCP 2.0 Decision for U.S. Appl. No. 16/269,498 (dated Jul. 27, 2020).
Final Office Action for U.S. Appl. No. 16/269,498 (dated May 8, 2020).
Commonly-assigned, co-pending U.S. Appl. No. 16/869,129 for "Methods, Systems, and Computer Readable Media for Testing Network Elements of an In-Band Network Telemetry Capable Network," (Unpublished, filed May 7, 2020).
Notice of Allowance and Fee(s) Due for U.S. Appl. No. 16/290,426 (dated May 7, 2020).
Commonly-assigned, co-pending U.S. Appl. No. 16/290,426 for "Methods, Systems, and Computer Readable Media for Testing a Network Node or a Related Application Programming Interface Using Source Code Metadata," (Unpublished, filed Mar. 1, 2019).
Zhang et al., "HyperVDP: High-Performance Virtualization of the Programmable Data Plane," IEEE Journal on Selected Areas in Communications, vol. 37, No. 3, pp. 556-569 (Mar. 2019).
Commonly-assigned, co-pending U.S. Appl. No. 16/269,498 for "Methods, Systems, and Computer Readable Media for Providing Dynamically Configurable, Distributed Network Visibility Device," (Unpublished, filed Feb. 6, 2019).
"The World's Fastest & Most Programmable Networks," Barefoot Networks, https://barefootnetworks.com/resources/worlds-fastest-most-programmable-networks/, pp. 1-10 (Feb. 6, 2019).
"P4Runtime Specification," The P4.org API Working Group, Version 1.0.0, pp. 1-97 (Jan. 29, 2019).
"P4Runtime Specification," The P4.org API Working Group, Version 1.0.0-rc4, pp. 1-72 (Jan. 25, 2019).
"Dynamic Test-Based P4 Packet Blaster Hardware Configuration," IPCOM000257013D, pp. 1-6 (Jan. 10, 2019).
"Cubro Sessionmaster EXA48600," Cubro Network Visibility, pp. 1-5 (2019).
"P4lang / switch," https://github.com/p4lang/switch, pp. 1-4 (Copyright 2019).
"Sparkline," Wikipedia, https://en.wikipedia.org/wiki/Sparkline, pp. 1-3 (2019).
Commonly-assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).
Rodriguez et al., "BB-Gen: A Packet Crafter for P4 Target Evaluation", SIGCOMM Posters and Demos '18, pp. 1-3 (Aug. 20-25, 2018).
Commonly-assigned, co-pending U.S. Appl. No. 16/035,534 for "Methods, Systems, and Computer Readable Media for Testing a Network Node Using Source Code," (Unpublished, filed Jul. 13, 2018).
Saha et al., "Fault Detection Effectiveness of Source Test Case Generation Strategies for Metamorphic Testing," MET, arXiv:1802.07361v1, pp. 1-8 (Feb. 20, 2018).
Nötzli, "p4pktgen: Automated Test Case Generation for P4 Programs," SOSR '18, pp. 1-7 (Mar. 28-29, 2018).
Anand et al., "POINT: An Intent-driven Framework for Integrated Packet-Optical In-band Network Telemetry," Infinera Corporation, pp. 1-6 (2018).
Liang et al., "In-band Network Function Telemetry," Tsinghua University, pp. 1-3 (Aug. 20-25, 2018).
Iša et al., "Verification of Generated RTL from P4 Source Code," 2018 IEEE 26th International Conference on Network Protocols, pp. 1-2 (2018).
"Test Case Management for Improved QA," Perforce, pp. 1-13 (2018).
"Cubro's network packet broker evolution," Cubro Blog, pp. 1-3 (Jan. 15, 2018).
McKeown et al., "P4 Runtime—Putting the Control Plane in Charge of the Forwarding Plane," The P4 Language Consortium, pp. 1-6 (Dec. 4, 2017).
P4 (programminglanguage), Wikipedia, https://en.wikipedia.org/w/index/php?title=P4_(programming_language)&oldid=812348591, pp. 1-3 (Nov. 27, 2017).
"P416 Language Specification," The P4 Language Consortium, version 1.0.0, pp. 1-129 (May 22, 2017).
Hyun et al., "Knowledge-Defined Networking using In-band Network Telemetry," Department of Computer Science and Engineering, POSTECH, pp. 1-4 (2017).
Van, Tu Nguyen et al., "Towards ONOS-based SDN Monitoring using In-band Network Telemetry," Department of Computer Science and Engineering, POSTECH, pp. 1-6 (2017).
Shahbaz et al., "PISCES: A Programmable, Protocol-Independent Software Switch," SIGCOMM'16, pp. 1-14 (Aug. 22-26, 2016).
Papneja et al., "Basic BGP Convergence Benchmarking Methodology for Data-Plane Convergence," RFC 7747, pp. 1-35 (Apr. 2016).
Kim et al., "In-band Network Telemetry via Programmable Dataplaners," pp. 1-2 (2015).
Ginoza, "Request for Comments Summary RFC Nos. 2800-2899," RFC 2899, pp. 1-22 (May 2001).
Bradner et al., "Benchmaring Methodology for Network Interconnect Devices," RFC 2544, pp. 1-31 (Mar. 1999).
Non-Final Office Action for U.S. Appl. No. 16/035,534 (dated Apr. 13, 2020).
Hill et al., "Tracking Network Flows with P4," University of Amsterdam, System and Network Engineering, pp. 1-16 (2018).
Non-Final Office Action for U.S. Appl. No. 16/269,498 (dated Jan. 28, 2020).
Non-Final Office Action for U.S. Appl. No. 16/269,498 (dated Nov. 17, 2020).
Notice of Allowance and Fee(s) Due for U.S. Appl. No. 16/035,534 (dated Aug. 27, 2020).
Notice of Allowance and Fee(s) Due for U.S. Appl. No. 16/869,129 (dated Sep. 28, 2020).
Notice of Allowance and Fee(s) Due for U.S. Appl. No. 16/181,309 (dated Mar. 19, 2020).
Notice of Allowance and Fee(s) Due for U.S. Appl. No. 16/290,426 (dated Mar. 18, 2020).
Notice of Allowance and Fee(s) Due for U.S. Appl. No. 16/269,498 (dated Mar. 8, 2021).

(56) References Cited

OTHER PUBLICATIONS

Sommers et al., "Dynamic Test-Based P4 Packet Blaster Hardware Configuration ED—Darl Kuhn," IP.com, pp. 1-5 (2019).
"Keysight Test Automation Platform (TAP)," Keysight Technologies, V7.4, pp. 1-52 (Jun. 15, 2017).
Combined Search and Examination Report under Sections 17 & 18(3) for Great Britain Application Serial No. GB2009118.7 (dated Mar. 8, 2021).

* cited by examiner

ORIGINAL:
```
#define MPLS_DEPTH  3
/* all the tags but the last one */
header mpls_t mpls[MPLS_DEPTH];

parser parse_mpls {
#ifndef MPLS_DISABLE
    extract(mpls[next]);
    return select(latest.bos) {
        0 : parse_mpls;
        1 : parse_mpls_bos;
        default: ingress;
    }
#else
    return ingress;
#endif
}
```

MODIFIED:
```
#define MPLS_DEPTH  4
/* all the tags but the last one */
header mpls_t mpls[MPLS_DEPTH];

parser parse_mpls {
#ifndef MPLS_DISABLE
    extract(mpls[next]);
    return select(latest.bos) {
        0 : parse_mpls;
        1 : parse_mpls_bos;
        default: ingress;
    }
#else
    return ingress;
#endif
}
```

FIG. 6

Original Code:
```
parser parse_mpls {
#ifndef MPLS_DISABLE
    extract(mpls[next]);
    return select(latest.bos)
    {
        0 : parse_mpls;
        1 : parse_mpls_bos;
        default: ingress;
    }
#else
    return ingress;
#endif
}
```
— 706
— 708

Modified code:
```
parser parse_mpls {
#ifndef MPLS_DISABLE
    extract(mpls[next]);
    return select(latest.bos)
    {
        0 : parse_mpls;
        1 : parse_mpls_bos;
        default: scan_for_signature;
    }
#else
    return scan_for_signature;
#endif
}
```
— 710
— 712

```
// New header types:
header_type instrum_signature_t
{
    fields {
        signature:   32;
    }
}
header_type instrum_t {
    fields {
        flow_id : 16;
        sequence_number: 32;
        timestamp   : 32;
    }
}
// declare header instances:
header
instrum_signature_t   sig;
header instrum_t  instrum;
```

802

```
// New terminal parse states:

// Look for 32-bit signature
// If found, extract the instrumentation
// else proceed as for normal packet
#define SIGNATURE 0x12345678
parser scan_for_signature {
    return select(current(0, 32)) {
        SIGNATURE: extract_instrumentation;
        default : ingress;
    }
} parser extract_instrumentation {
    extract(sig);
    extract(instrum);
    return ingress;
}
```

METHODS, SYSTEMS, AND COMPUTER READABLE MEDIA FOR CONFIGURING A TEST SYSTEM USING SOURCE CODE OF A DEVICE BEING TESTED

TECHNICAL FIELD

The subject matter described herein relates to test system configuration. More specifically, the subject matter relates to methods, systems, and computer readable media for configuring a test system using source code of a device being tested.

BACKGROUND

Various tools and applications are available for configuring or programming network nodes. One such tool is a programming language, named P4, usable for programming the data plane (e.g., data packet processing) of a network node e.g., a programmable network device. The P4 language is designed to be implementation- or target-independent, protocol independent, and field reconfigurable. For example, P4 source code can be compiled for many different types of targets, has no native support for network protocols, and allow operators to change the way a target (e.g., a central processing unit (CPU), a network processor, a field programmable gate array (FPGA), or an application specific integrated circuit (ASIC)) processes packets after deployment. However, issues can arise when utilizing the P4 language and similar tools. In particular, a network operator needs to be able to effectively test network nodes, including any P4 source code related functionality. While conventional test tools may be designed for hardware appliances with fixed functionality, such tools are not well-suited for testing network nodes with reconfigurable features, e.g., via the P4 programming language.

Other domain-specific programming languages exist to program the dataplanes of devices. One such example is the network programming language (NPL) by Broadcom, Inc. While this language is restricted for use on specific devices, the same general principles and implications hold true. In particular, the user-defined behavior results in new testing challenges.

Accordingly, in light of these difficulties, a need exists for improved methods, systems, and computer readable media for configuring a test system using source code of a device being tested.

SUMMARY

Methods, systems, and computer readable media for configuring a test system using source code of a device being tested are disclosed. According to one method, the method occurs at a network equipment test device. The method includes receiving one or more device source files associated with a device under test (DUT); analyzing the one or more device source files to determine configuration source code for configuring at least one test system resource in the network equipment test device, wherein analyzing the one or more device source files includes identifying functionality of the DUT based on device source code portions and determining, using the device source code portions, the configuration source code for testing the functionality of the DUT; configuring, using the configuration source code, the at least one test system resource; and testing the DUT using the at least one test system resource.

According to one system, the system includes a network equipment test device. The network equipment test device includes at least one processor and memory. The network equipment test device is configured for: receiving one or more device source files associated with a DUT; analyzing the one or more device source files to determine configuration source code for configuring at least one test system resource in the network equipment test device, wherein analyzing the one or more device source files includes identifying functionality of the DUT based on device source code portions and determining, using the device source code portions, the configuration source code for testing the functionality of the DUT; configuring, using the configuration source code, the at least one test system resource; and testing the DUT using the at least one test system resource.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function" and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 6 is a diagram illustrating code portions associated with testing header stacks;

FIG. 7 is a diagram illustrating code portions associated with instrumentation parser states;

FIG. 8 is a diagram illustrating code portions associated with supporting instrumentation header data and parser states.

DETAILED DESCRIPTION

The subject matter described herein relates to methods, systems, and computer readable media for configuring a test system using source code of a device being tested. When testing one or more network nodes, it may be desirable to model a test or related workload such that the test is relevant to the functionality of the device or system under test.

In accordance with some aspects of the subject matter described herein, a network equipment test device or a related entity may generate one or more configuration files (e.g., P4 source files, test plans, test variables and related test values, test conditions, test actions, etc.) for configuring the network equipment test device or resource(s) therein. For example, a network equipment test device may test an ASIC-based switch programmed or configured using one or more P4 source files. In this example, the network equipment test device or a related entity may receive and analyze the P4 source files to generate source code for a test system resource and test metadata for testing the ASIC-based switch. Continuing with this example, the test system resource may use this information to may generate test traffic for testing the ASIC-based switch, e.g., based on the identified test metadata and/or related test plans (e.g., protocol templates, packet templates, flow templates, test templates, etc.).

By using source code to generate configuration data for configuring one or more test system resources, a network equipment test device in accordance with aspects described herein can dynamically test a network node quickly and efficiently. For example, by using P4 (or other language) source code of a ASIC-based switch to generate source code and test metadata for one or more test system resources, a network equipment test device in accordance with aspects described herein can quickly configure itself or resources therein to test aspects of the ASIC-based switch, which can significantly reduce the amount of time needed for test configuration by a human operator.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
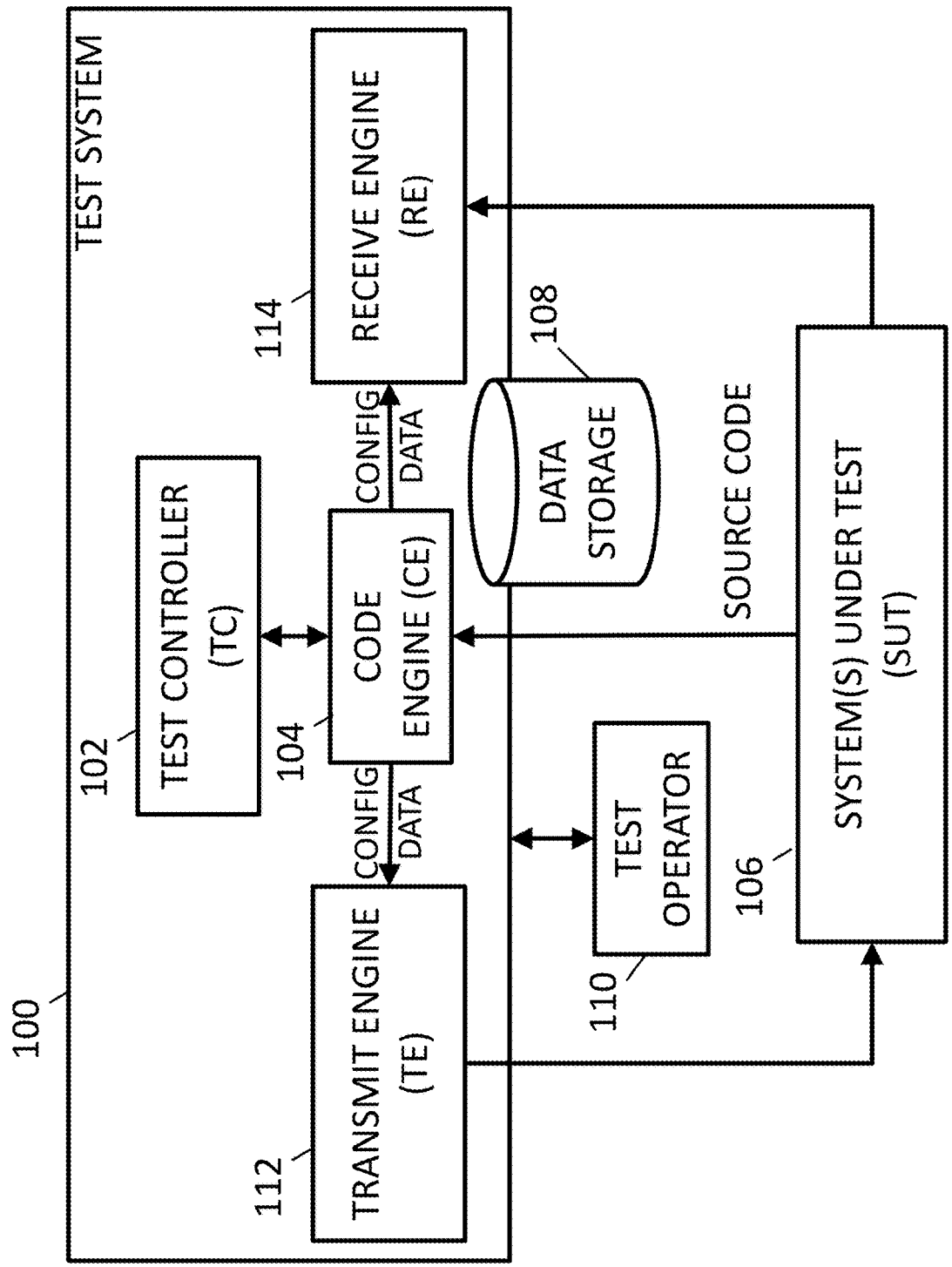
FIG. 1 is a diagram illustrating an example test system for configuring a test system using source code of a device being tested.

FIG. 1 is a diagram illustrating an example test system 100 for configuring a test system using source code of a device being tested. Referring to FIG. 1, an example environment may include test system 100 and one or more device(s) and/or system(s) under test (SUT) 106. Test system 100 may represent any suitable entity or entities (e.g., one or more computing platforms, nodes, or devices) associated with testing SUT 106 (e.g., one or more security devices). For example, test system 100 may generate and send traffic to SUT 106 and/or receive traffic from SUT 106 and may analyze one or more performance aspects associated with SUT 106.

SUT 106 may be any suitable entity or entities (e.g., devices, systems, or platforms) for receiving, processing, forwarding, and/or sending one or more messages (e.g., packets). In some embodiments, SUT 106 may include a network node (e.g., a network switch, a network router, a network interface card, a packet forwarding device), a central processing unit (CPU), a network processor, a field programmable gate array (FPGA), or an application specific integrated circuit (ASIC). For example, SUT 106 may include software and/or a VM executing on shared resources (e.g., compute, storage, and network resources in a cloud computing environment). In some embodiments, SUT 106 or related logic (e.g., rules associated with packet forwarding/processing) may be configured or programmed using one or more programming languages, e.g., the P4 language maintained by the P4 Language Consortium.

In some embodiments, test system 100 may include a stand-alone tool, a testing device, a network equipment test device or platform, or software executing on one or more processor(s). In some embodiments, test system 100 may be a single device or node or may be distributed across multiple devices or nodes. In some embodiments, test system 100 may include one or more modules for performing various test related functions. For example, test system 100 may include a traffic (e.g., packet) generator for generating test traffic and/or a code engine for analyzing source code of SUT 106 to identify or determine test metadata for testing SUT 106.

Test system 100 may include a test controller (TC) 102, a code engine (CE) 104, a data storage 108, a transmit engine (TE) 112, and a receive engine (RE) 114. TC 102 may be any suitable entity or entities (e.g., software executing on a processor, an FPGA, an ASIC, or a combination of software, an FPGA, and/or an ASIC) for performing one or more aspects associated with testing SUT 106 and/or various aspects thereof. In some embodiments, TC 102 may be implemented using one or more processors and/or memory. For example, TC 102 may utilize one or more processors (e.g., executing software stored in memory) to generate test plans or related test sessions. In this example, TC 102 may also utilize one or more processors to send instructions to various modules or entities in test system 100 for controlling (e.g., pause, restart, or stop) a test session, e.g., based on input from test operator 110.

CE 104 may be any suitable entity or entities for performing one or more aspects associated with processing source code or related source files. In some embodiments, CE 104 may implement various functions using one or more processors and/or memory. For example, CE 104 may compile or interpret source code into intermediate or machine code for execution at SUT 106. In another example, CE 104 may analyze or inspect source code for generating configuration data for configuring test system resources for testing SUT 106. In this example, CE 104 may identify particular source code primitives or related code portions and use information therein to generate relevant source code and test metadata for testing packet parsing, packet processing, or other actions performed by SUT 106.

TE 112 may be any suitable entity or entities (e.g., software executing on a processor, an FPGA, and/or an ASIC) for performing one or more aspects associated with generating test traffic and/or transmitting packets for testing SUT 106. In some embodiments, TE 112 may be implemented using one or more processors and/or memory and may be configurable using the P4 language or another programming language. For example, using configuration data from TC 102 and/or CE 104, TE 112 may generate and transmit test packets for various message streams (e.g., flows or sessions) to SUT 106.

RE 114 may be any suitable entity or entities (e.g., software executing on a processor, an FPGA, and/or an ASIC) for performing one or more aspects associated with receiving test traffic or related responses from SUT 106. In some embodiments, RE 114 may be implemented using one or more processors and/or memory and may be configurable using the P4 language or another programming language. For example, using configuration data from TC 102 and/or CE 104, RE 114 may receive traffic (e.g., responses to test packets) from SUT 106. In this example, RE 114 may also be configured to perform analyses involving test packets and/or related responses from SUT 106.

In some embodiments, test system 100 and/or various entities therein may include one or more communications interfaces (e.g., one or more receive port modules and one or more transmit port modules) for interacting with users, modules, and/or nodes. For example, TE 112 and/or RE 114 may include port modules may include network interface cards (NICs) or other suitable hardware, firmware, and/or software for receiving or transmitting data via ports (e.g., physical or logical communication end points).

In some embodiments, test system 100 and/or various entities therein may include or provide a communications interface for communicating with a test operator 110. In such embodiments, test operator 110 may be any entity (e.g., an automated system or a device or system controlled or controllable by a human user) for selecting and/or configuring various aspects associated with testing and/or generating testing related metrics. For example, user interfaces (e.g., an application programming interface (API) and a graphical user interface (GUI)) may be provided for inputting or modifying configuration information, such as tests to be performed, types of metrics or statistics to be generated, and/or other settings.

In some embodiments, one or more user interfaces at test system 100 may support automation e.g., via one or more programming languages (e.g., python, PHP, etc.), a representation state transfer (REST) or other API, a command line, and/or a web based GUI. For example, test operator 110 may use a web browser to interact with a web based GUI at TC 102 or CE 104 for programming or configuring one or more aspects for testing SUT 106.

In some embodiments, TC 102 or CE 104 may communicate with test system 100 and/or other related entities and may provide test configuration information (e.g., test metadata) usable to set up and/or execute one or more test sessions. For example, test configuration information may be derived or obtained by analyzing P4 (or other language) source files. In this example, the test configuration information may be used to generate test plans usable for generating and sending particular traffic and/or flows to SUT 106.

In some embodiments, TC 102, CE 104, TE 112, RE 114, and/or other entities in test system 100 may include functionality for accessing data storage 108 or other memory. Data storage 108 may be any suitable entity or entities (e.g., a storage device, memory, a non-transitory computer readable medium, or a storage system) for maintaining or storing information related to testing. For example, data storage 108 may store message capture related information, e.g., time delta information, timestamp related data, and/or other information. In this example, message capture related information may be usable to determine, derive, or compute one or more test related statistics, such time variation metrics for indicating scheduling fidelity.

In some embodiments, data storage 108 may also contain information usable for generating statistics and/or metrics associated with one or more aspects of SUT 106. For example, data storage 108 may contain metrics associated with one or more performance aspects of SUT 106 during one or more test scenarios. In this example, data storage 108 may maintain a particular set of computed metrics for a first test session or message stream and may maintain another set of computed metrics for a second test session or a different message stream. In some embodiments, data storage 108 and/or memory may be located at test system 100, another node, or distributed across multiple platforms or devices.

In some embodiments, test system 100 or one or more entities therein (e.g., CE 104) may be configured for analyzing source code or related files associated with SUT 106 and for generating source code and/or other data for configuring test system resources, e.g., TE 112, RE 114, and/or other entities. For example, CE 104 may parse a P4 source file (e.g., a 'switch.p4' file) and may extract or derive a packet format definition (e.g., headers, header fields, and other data), code portions, and packet processing logic from the P4 source file. In this example, CE 104 may use this extracted or derived data to generate source code (e.g., a P4 source file or a non-P4 source file) usable for configuring a test system resource, e.g., a target device that is internal to or part of test system 100, TE 112, or RE 114.

In some embodiments, CE 104 may be configured to read and/or parse one or more P4 source file(s) associated with SUT 106. In such embodiments, CE 104 may process the P4 source file information and generate, using this information, one or more P4 source files for dynamically configuring a test system resource (e.g., TE 112 or RE 114) associated with testing SUT 106.

In some embodiments, CE 104 and/or another entity may be configured to receive data and/or test related input from test operator 110 related to testing SUT 106, e.g., a non P4 configured device. In such embodiments, CE 104 and/or another entity may process and/or analyze the provided data and generate, using this information, one or more P4 source files for dynamically configuring a test system resource (e.g., TE 112 or RE 114) associated with testing SUT 106.

In some embodiments, CE 104 and/or TC 102 may work together for compiling generated or derived source code (e.g., a P4 or non-P4 source file) into an appropriate configuration image (e.g., binary data) that may be loaded onto a test system resource (e.g., an ASIC, TE 112, or RE 114).

In some embodiments, test system 100 or one or more entities therein (e.g., TC 102 and/or CE 104) may be configured for analyzing source code or related files associated with SUT 106 and for generating test metadata for testing SUT 106. For example, CE 104 may parse a P4 source file (e.g., a 'switch.p4' file) and may extract or derive a packet format definition (e.g., headers, header fields, and other data) and packet processing logic from the P4 source file. In this example, CE 104 may use this extracted or derived data to generate test metadata, which may use to create test traffic (e.g., via a packet generator) and/or to automatically generate one or more test plans for testing aspects of SUT 106, e.g., a protocol implementation defined in the P4 source file.

In some embodiments, test system 100 or one or more entities therein (e.g., TC 102 and/or CE 104) may inspect source code or related files associated with SUT 106 for identifying corner cases (e.g., scenarios that occur outside normal operating conditions) and using these identified corner cases to automatically add variations to one or more test plans to test the corner cases. For example, CE 104 may identify 'define' code portions indicating valid values for an Ethernet 'ethertype' field. In this example, using the information from the 'define' code portions, CE 104 may generate test metadata that define, trigger, or yield packets with invalid 'ethertype' values and may generate test metadata that define, trigger, or yield packets with valid 'ethertype' values.

In some embodiments, test system 100 or one or more entities therein (e.g., TC 102 and/or CE 104) may be configured to automatically identify and integrate "new protocols" defined in source code or related files for test configuration. For example, test system 100 (e.g., an IxNetwork test system) may include a configuration GUI that can parse test metadata generated from source code. In this example, test system 100 or a related entity may identify a new protocol defined in the test metadata and may use the new protocol for configuring test traffic for testing SUT 106.

Continuing with this example, test system 100 or a related entity may invoke properly configured packet generators to generate test traffic, variation in test traffic, statistics, and flow tracking usable for testing SUT 106 based on the new protocol and/or other test metadata derived from the source code.

In some embodiments, test system 100 or one or more entities therein (e.g., TC 102 and/or CE 104) may be configured to monitor performance of SUT 106 and/or display performance metrics to test operator 110. For example, test system 100 may include network interface cards or receive ports therein for observing responses to test packets from SUT 106. In this example, the receive ports may be configured to perform or monitor various metrics or statistics (e.g., packet loss, latency, jitter, etc.) based on one or more user- or system-defined tracking header fields. Continuing with this example, statistics, performance metrics, and/or other data associated with testing SUT 106 may be provided or displayed to test operator 110 via a GUI or other interface.

In some embodiments, test system 100 or another entity (e.g., CE 104) may generate a number of test plans (e.g., protocol templates, packet templates, flow templates, test templates, etc.) or related information. For example, CE 104 or another entity may generate test plans that are based on possible combinations of protocol headers defined in a source file (e.g., a P4 or other language file). In this example, CE 104 or another entity may traverse a related parse graph for visiting processing states from a 'start' state to an 'accept' or 'reject' state. Continuing with this example, by inspecting the parse graph of a source file, CE 104 or another entity may identify a sequence of headers for testing one or more paths of the parser. In some embodiments, for a depth first traversal of all paths in a parse graph, multiple test plans may be generated for testing these paths.

In some embodiments, test system 100 or another entity (e.g., CE 104) may identify protocol field values and/or related value selection modes (e.g., patterns) for testing SUT 106. For example, CE 104 or another entity may identify and/or inspect 'verify' and 'select' conditions in each parse state defined in a source file and may use these conditions to generate test metadata that indicate values of specific fields in test packets for testing SUT 106. In another example, CE 104 or another entity may identify and/or inspect 'key' and the 'entries' from tables defined in a source file and may use this information to generate test metadata that indicate values of specific fields in test packets for testing SUT 106. In another example, CE 104 or another entity may also identify and/or inspect conditions associated with table actions defined in a source file and may use this information to generate test metadata for testing SUT 106.

In some embodiments, CE 104 may include functionality for analyzing source code and/or related files (e.g., router/parser source code 202 and switch/parser source code 204) to identify code portions usable for generating source code to configure one or more test system resources and/or usable for deriving or obtaining test metadata. For example, CE 104 may include a test metadata generator that obtains and/or derives test metadata based on certain keywords or code sections. In this example, the test metadata may be used to generate test plans and/or related test packets for testing SUT 106.

In some embodiments, CE 104 may use source code or derived data therefrom (e.g., packet header definitions, parse graph (possible paths), error paths, exit conditions) along with heuristics (e.g., matching algorithms associated with header names, fields, or combination of header field widths (if field names are obfuscated or not easily derivable) and user input to generate proposed test plans for testing SUT 106. For example, using source code and heuristics, CE 104 may determine that SUT 106 is capable of handling well-known (e.g., industry standards based) headers such as Ethernet IPV4, etc. or may determine that SUT 106 is capable of handling less-known (e.g., custom or proprietary) headers such as custom data center fabric headers, custom tunnel encapsulations, custom application-specific headers, etc. In this example, CE 104 may use this analysis to generate a list of candidate test cases and present to test operator 110, in an organized manner, proposed test plans.

In some embodiments, proposed test plans may be ordered using heuristics and may include industry standards based tests for well-known protocols (e.g., RFC 2544, RFC 2899, RFC 7747, etc.) and/or tests that are generated based on analysis of SUT related source code, historical data, and/or user preferences For example, an unrecognized header type could result in a variety of test opportunities such as iterating of all possible values automatically, fuzzing (random) values, etc.

In some embodiments, configuration source code for configuring a test system resource may include code portions for testing various functions of SUT 106. In such embodiments, the code portions may be generated and/or selected, and optionally, modified from preexisting code portions (e.g., stored in data storage 108) based on analysis of SUT's source code by CE 104. For example, CE 104 may access a data store of predefined (e.g., boilerplate, template based, or standard) code portions. In this example, the predefined code portions may be modified based user input (e.g., from test operator 110), SUT source code, or a detected environment and may be incorporated into SUT-derived source code.

In some embodiments, configuration source code may include code for testing handling of header stacks at SUT 106 by generating a parse graph which includes header stacks larger than the SUT code's stacks or by generating parser graph paths which don't exist in the SUT's code. For example, assume a SUT's parser includes "normal" paths representing Ethernet-IPv4, Ethernet-IPv6; further assume that all other parser paths cause packets to be dropped, or perhaps cause packets to be forwarded to the network switch's CPU controller (the "exception" path). Therefore, the configuration source code may generate parser graph paths including additional protocols which test the logic of the SUT's parser and/or the robustness of the controller when receiving exception packets.

In some embodiments, configuration software may include functionality for generating test code that implements counter-based, register-based or table-based state machines for testing possible input packets supported by SUT 106.

In some embodiments, configuration software may include functionality for supporting one or more parser states to handle instrumentation packet "headers" which can be a data portion appended to the final protocol header(s) for normal parser paths. For example, configuration source code may generate, modify, or extend a parser graph (e.g., based on SUT's source code) for writing, reading and/or accessing instrumentation data (e.g., data to track various packet flows, sequence checking, latency measurements, data integrity checking, etc.)

In some embodiments, predefined code portions may include code for packet stream modification (e.g., packet editing code, rate-control code, packet forwarding (unicast/multicast) code), code for packet instrumentation (e.g., code for inserting special signatures to indicate instrumentation, code for generating and/or inserting flow identifiers, timestamps, and/or other instrumentation data), code for supporting statistical counters to measure input and output packet counts and byte counts on a per-port and per-flow basic, code for tracking end-to-end testing, code for packet latency calculation, code for sequence number generation, code for detecting dropped and out-of-order packet delivery, and/or code for detecting data corruption.

In some embodiments, CE 104 may use source code or derived data therefrom (e.g., packet header definitions, parse graph (possible paths, error paths, exit conditions) to determine positive tests (e.g., testing all possible valid combinations of header stacks) and negative tests (e.g., testing illegal header data, such as too many header stacks, or missing or superfluous headers) for testing SUT 106.

In some embodiments, test system 100 or another entity (e.g., CE 104) may generate one or more test plans for testing SUT 106 with valid values (e.g., parameter field values) and may also generate one or more test plans for testing SUT 106 with invalid values. For example, CE 104 or another entity may generate one or more 'reject' test plans that define, trigger, or yield packets that are to be rejected by SUT 106. In this example, assuming SUT 106 supports a multiprotocol label switching (MPLS) header stack of depth of three, CE 104 or another entity may generate a first 'reject' test plan that define, trigger, or yield packets with zero MPLS headers and a second 'reject' test plan that define, trigger, or yield packets with four MPLS headers. Continuing with this example, SUT 106 should rejects test packets associated with both the first and the second 'reject' test plan. In another example, CE 104 or another entity may generate one or more 'accept' test plans that define, trigger, or yield packets that are to be accepted by SUT 106. In this example, assuming SUT 106 supports a multiprotocol label switching (MPLS) header stack of depth of one, two or three, CE 104 or another entity may generate an 'accept' test plan that define, trigger, or yield packets with one, two or three MPLS headers.

In some embodiments, test system 100 or another entity (e.g., CE 104) may generate or include source file metadata and/or other information in test plans. For example, when generating a test plan based on a P4 source file, CE 104 or another entity may include source file information, source file date, a version number, etc. in the test plan.

In some embodiments, a test plan may also include a plan description and a summary of how the plan relates to a test case (e.g., condition or scenario being tested). For example, a test plan may include useful information to distinguish a plan with invalid header field values from a test plan with valid header field values. In another example, a test plan may include topology information discovered or derived from a P4 or other language source file and various data emitted by CE 104 or a related compiler, e.g., a source file name, a date of import, a version number of a test tool, etc.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
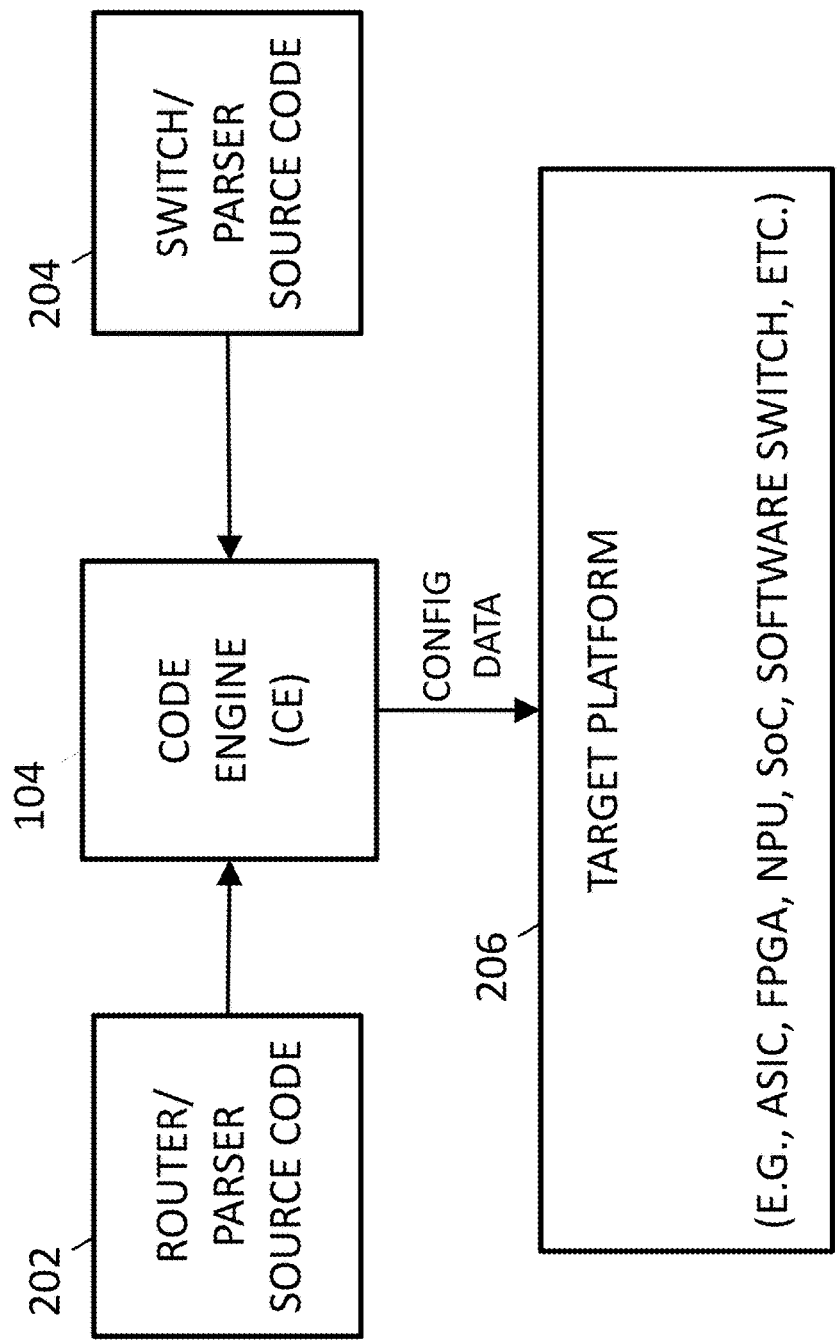
FIG. 2 is a diagram illustrating an example code engine (CE) for processing source code.

FIG. 2 is a diagram illustrating an example environment 200 for processing source code for programming SUT 106. Referring to FIG. 2, test system 100 may include CE 104. In some embodiments, CE 104 may include functionality for processing source code and/or related files, e.g., router/parser source code 202 and switch/parser source code 204. Each of router/parser source code 202 and switch/parser source code 204 may represent source code for programming one or more aspects of a network node, a router, a switch, a network interface card, a programmable network device, or an ASIC. For example, router/parser source code 202 may be one or more P4 source files for programming a router and/or its related data plane (e.g., how it processes and routes packets). In another example, switch/parser source code 204 may be one or more P4 source files for programming a switch and/or its related data plane (e.g., how it processes and switches packets).

In some embodiments, CE 104 may include functionality for validating source code and/or related file formats (e.g., P4 or other language source files). For example, CE 104 may validate that switch/parser source code 204 is from an authorized source and/or may confirm that switch/parser source code 204 can be interpreted or compiled into valid machine code for execution. In this example, CE 104 may notify a network operator and/or may store various details if errors are found in the source code or other issues are detected.

In some embodiments, CE 104 may include functionality for compiling and/or interpreting source code into machine code, byte code, or other code (e.g., intermediate code) for implementation or executing at a target platform 206. For example, CE 104 may compile or interpret P4 source code into a JavaScript Object Notation (JSON) formatted behavioral model usable by a C++ implemented software switch (e.g., bmv2).

Target platform 206 may represent various entities for executing source code or related logic (e.g., compiled machine code). For example, target platform 206 may include a general-purpose network programming unit (NPU) (e.g., a network processor), a CPU, a field programmable gate array (FPGA), a software switch (e.g., executing on one or more general processors), a system-on-chip (SoC), or an application specific integrated circuit (ASIC).

In some embodiments, target platform 206 may represent a programmable or configurable test system resource. For example, target platform 206 may include TE 112, RE 114, and/or another device or entity in test system 100. In some embodiments, target platform 206 may require a compiler (e.g., software embedded in target platform 206, TC 102, or CE 104) for mapping or converting P4 or other language source code into byte or machine code that represents a target machine model. In this example, the byte or machine code generated will be dependent on target platform 206.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity. Further, while FIG. 2 discloses router/parser source code 202 and switch/parser source code 204 as source code examples, it will be appreciated that other source files may be usable for programming a programmable network device or an ASIC, e.g., a load balancing function, an intrusion detection function, an intrusion protection function, an antivirus function, an antispam function, a firewall function, a switching function, or a routing function.

Figure 3:
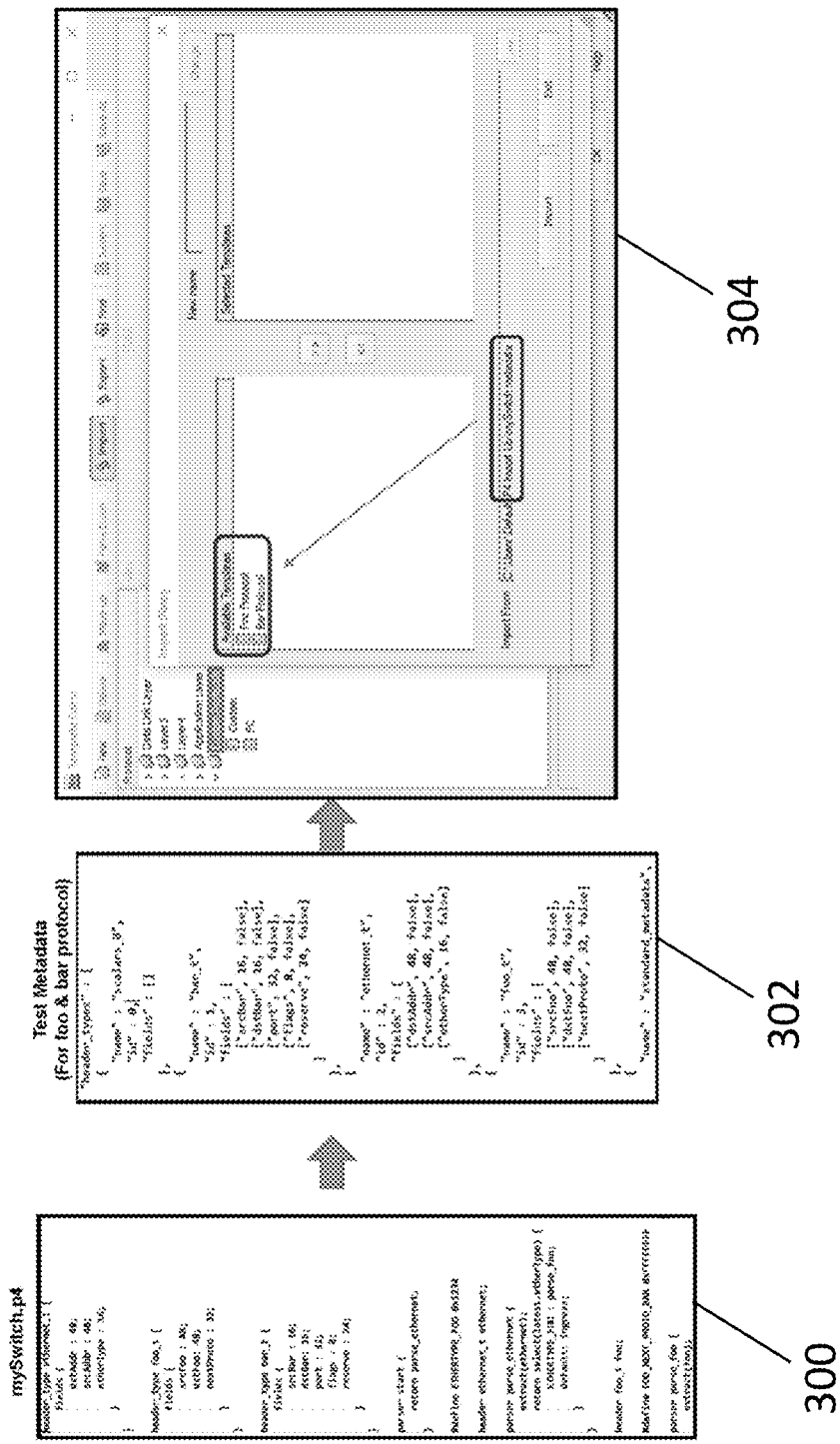
FIG. 3 is a diagram illustrating an example user interface for importing test metadata derived from source code.

FIG. 3 is a diagram illustrating an example user interface 304 for importing test metadata 302 derived from source code 300. In some embodiments, e.g., where test system 100, TC 102, CE 104, and/or another entity includes or incorporates a source code compiler, source code 300 may be imported directly into test system 100 and test metadata 302 may be generated or derived from source code 300 by test system 100 or an entity therein (e.g., CE 104).

In some embodiments, test system 100, TC 102 and/or another entity may include user interface 304 for configuring a test session or related aspects (e.g., a test plan). For example, after CE 104 analyzes source code 300 and derives and/or generates configuration data including test metadata 302, test operator 110 may select one or more files containing test metadata 302 via user interface 304. In this example, after importing test metadata 302 into TC 102 using user interface 304, test operator 110 may use a test plan configuration GUI (e.g., a template editor) to modify or change a test plan that defines test traffic to send to SUT 106 during a test session. In another example, test system 100 and/or CE 104 may receive and analyze source code 300, generate test metadata 302, and automatically import and/or use test metadata 302 for creating or modifying a test plan or for performing other test related configuration in test system 100.

Referring to FIG. 3, source code 300 may represent code from a P4 file. For example, source code 300 may include information for defining a data plane of a test system resource, e.g., TE 112, RE 114, etc. In this example, source code 300 may define valid packet structure, protocol structure, related header fields, and/or values for one or more fields associated with one or more protocols that a switch can parse and/or process.

In some embodiments, source code 300 may be associated with SUT 106. For example, source code 300 represents the logic implemented in SUT 106. In this example, CE 104 may receive the source code from test operator 110 or another entity (e.g., the manufacturer of SUT 106 or a device therein).

In another example, CE 104 may generate source code 300 to test SUT 106 or an aspect therein. In this example, source code 300 may be derived from or generated based on the source code corresponding to logic implemented in SUT 106.

In some embodiments, test system 100 or a related entity (e.g., CE 104) may analyze source code 300 for relevant code portions usable to generate test metadata 302. For example, test system 100 or a related entity (e.g., CE 104) may be configured to identify and inspect fields data structures in 'header type' code portions (e.g., 'header_type ethernet_t' and 'header_type foo_t', and 'header_type bar t' portions) and may use these data structures to determine field names for one or more protocol headers. In another example, test system 100 may identify and inspect 'verify', 'define' and 'select' code portions in source code 300 and may use data therein to identify test conditions and/or determine values of protocol fields for test metadata 302.

Test metadata 302 may represent data usable for configuring or defining a test plan for testing SUT 106. For example, test metadata 302 may include various data regarding two protocols (e.g., Foo and Bar) defined or mentioned in source code 300. In this example, test metadata 302 may include field names, byte length or sizes, and Boolean values indicating whether the field values are to be validated or tested.

User interface 304 can allow test metadata 302 derived from source code 300 to be imported. For example, after CE 104 analyzes source code 300, generates test metadata 302 derived from source code 300, and creates a metadata file containing test metadata 302, test operator 110 can input the file name (e.g., 'switch.metadata') of the metadata file in an import dialog of a template editor GUI, e.g., of test system 100 or a related entity (e.g., TC 102). In this example, once a file name is inputted, test system 100 or a related entity may inspect the file for available protocol templates in the test metadata 302. In another example, test system 100, TC 102, or another entity (e.g., CE 104) may generate and utilize test metadata 302 automatically in test system 100. In this example, prior to test metadata 302 being automatically generated and imported, test operator 110 may use user interface 300 or another user interface for selecting source files from which test metadata 302 is derived or obtained.

In some embodiments, test system 100 or a related entity (e.g., TC 102) may generate and use protocol templates based on test metadata 302 and/or use imported protocol templates to configure test plans or related information for a traffic generator and/or other testing entities. For example, test system 100 or a related entity may generate test traffic for testing SUT 106 based on test metadata 302 that indicates valid and/or invalid packet and/or protocol structure based on the imported protocol templates.

It will be appreciated that FIG. 3 is for illustrative purposes and that various aspects described above in relation to FIG. 3 may be changed, altered, added, or removed. For example, some user interface elements and/or features described in FIG. 3 may be removed or modified.

Figure 4:
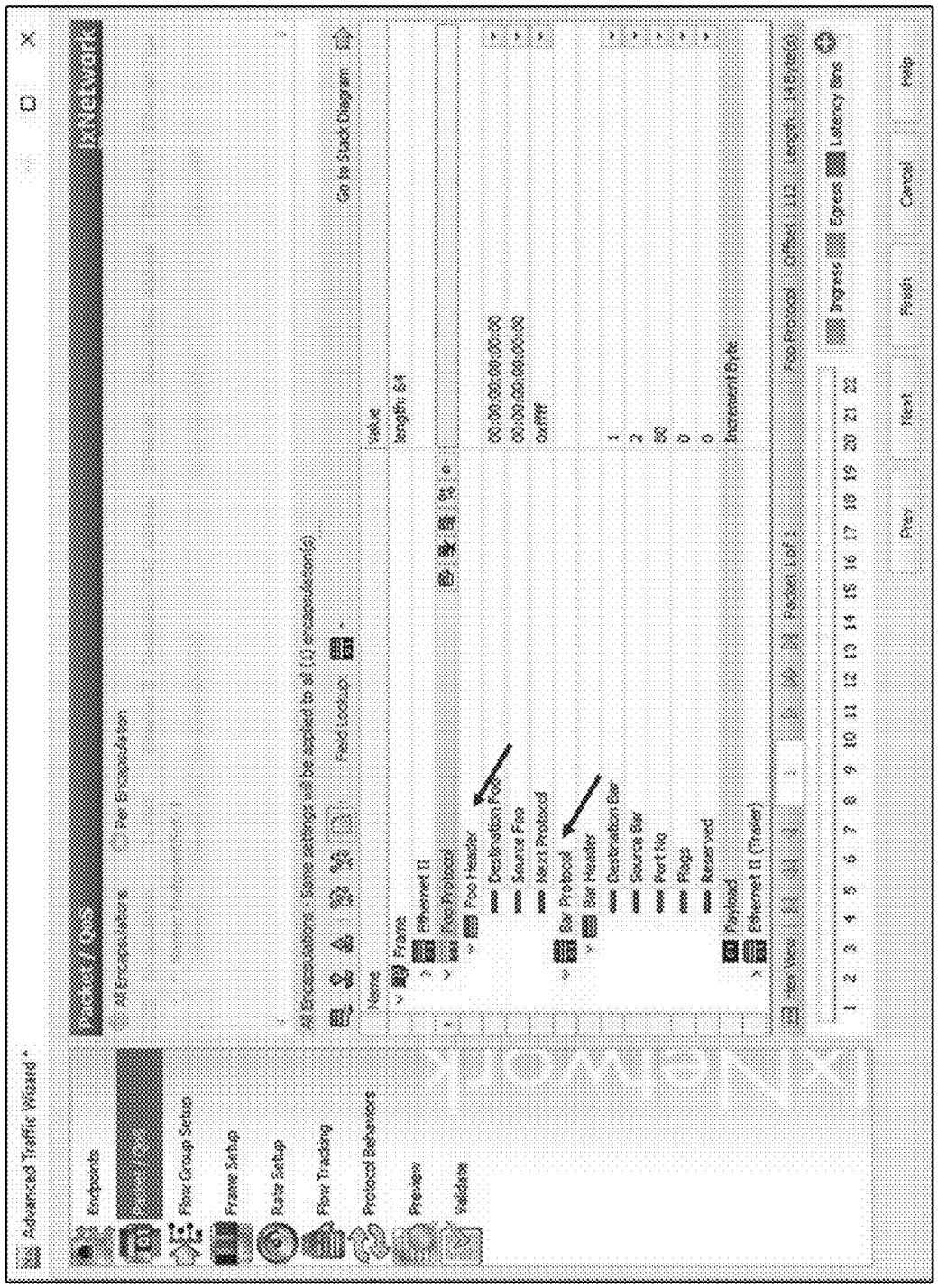
FIG. 4 is a diagram illustrating an example user interface for configuring a test session.

FIG. 4 is a diagram illustrating an example user interface 400 for configuring a test session. For example, user interface 400 may display various test system resources or settings, such as protocol structure components (e.g., frame length, frame/packet structure, protocol fields and related values) defined in SUT source code or from test metadata derived therefrom via user interface 400.

In some embodiments, user interface 400 can provide a graphical view for one or more protocols derived or imported from P4 files. For example, a P4 file may indicate that a frame or packet can include an Ethernet II header, a Foo Protocol header, and a Bar Protocol header. In this example, test metadata indicating this packet structure may be uploaded or imported into a TC 102 and/or another entity, whereby user interface 400 can display the packet structure (e.g., protocol stack) in a 'tree view' user interface element.

In some embodiments, test operator 110 may configure or select various values for protocol header fields for a test session via user interface 400. In this example, the values used during a test session may be based on one or more value selection modes, such as an incrementing pattern, where a user can configure the pattern by entering a start value, a step or increment value, and a count value (e.g., how many times to increment before starting over at the start value).

In some embodiments, user interface 400 can allow selection of values for one or more fields for a test session or related test plan. For example, a user can select values of a port number field or a flags field of a Bar protocol (e.g., the Bar protocol being imported or derived from SUT source code) to use for testing SUT 106. In some embodiments, user interface 400 can provide a list of radio box or other user interface element(s) for selecting and/or configuring a value selection mode. Example value selection modes may be a single value, an incrementing pattern, a decrementing pattern, a list of values, a repeatable random (bitmask) pattern, a repeatable random (range) pattern, or a random pattern (e.g., non-repeatable pattern).

Figure 5:
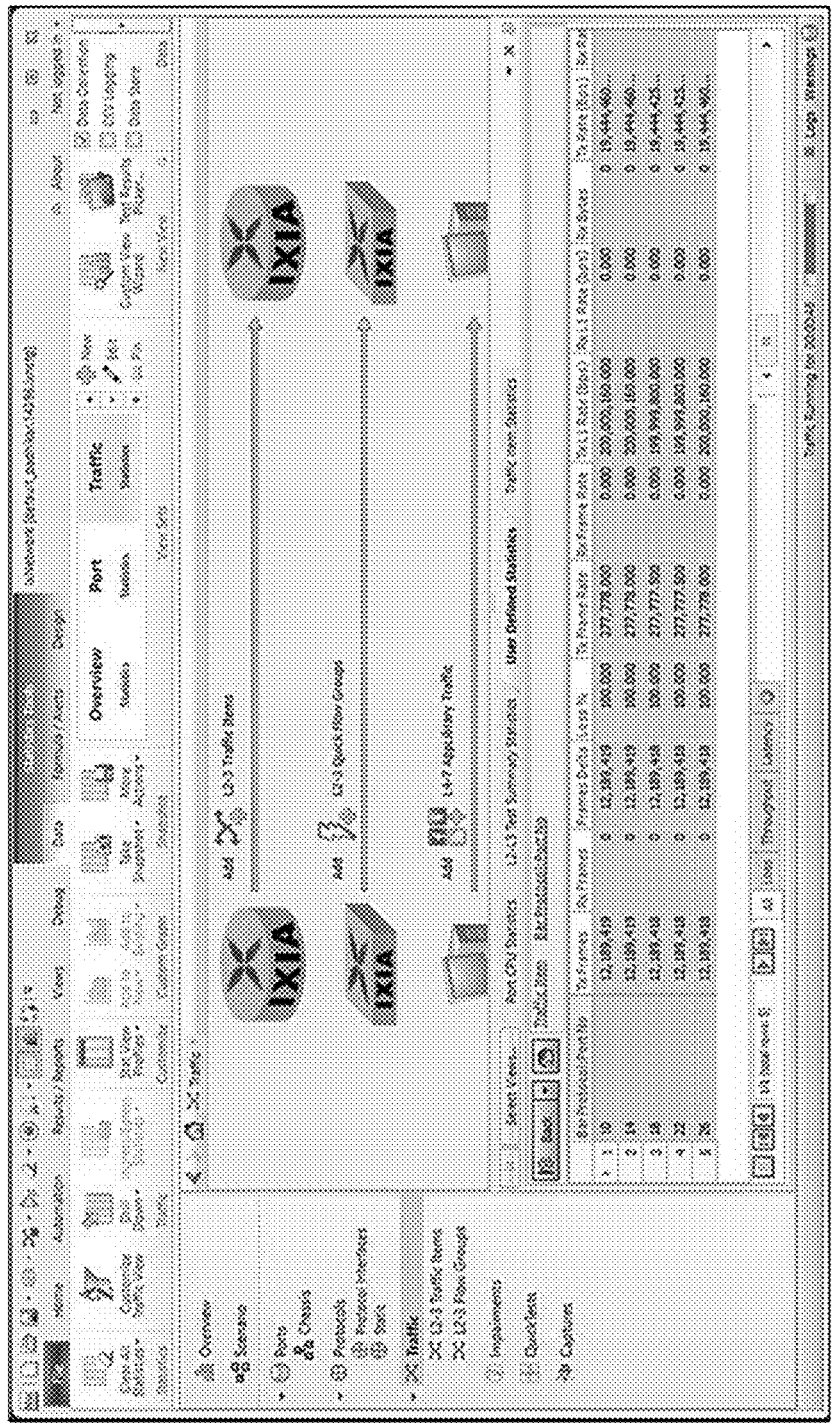
FIG. 5 is a diagram illustrating an example user interface for monitoring a test session or related aspects.

FIG. 5 is a diagram illustrating an example user interface 500 for monitoring a test session or related aspects. For example, user interface 500 may display transmit (Tx) frame rates and/or other test statistics during and/or after a test session or test plan. In this example, test operator 110 may view at least some test statistics as they are generated on-the-fly and may drill down in user interface 500 for various test aspects.

In some embodiments, user interface 500 can allow selection of one or more fields for line rate tracking. For example, a user can select a port number field of a Bar protocol (e.g., a field imported or derived from a SUT source code) which can be used to track ingress and egress traffic. In some embodiments, user interface 500 can provide hex views of one or more received or sent packets. For example, user interface 500 can highlight particular portions of a packet that is being tracked (e.g., port number field and/or another field). In some embodiments, user interface 500 may display latency bins (e.g., bins indicative of different amounts of latency) for ingress and/or egress traffic.

In some embodiments, user interface 500 may display statistics based on field values (e.g., port number) of test traffic, where the statistics are selected by test operator 110 or based on predetermined preferences. For example, test system 100 or a related entity may test SUT 106 by generating and sending a number of test packets (e.g., at line rate) to SUT 106. In this example, test operator 110 or a test plan may indicate one or more user defined statistics which may be based on field values associated with a protocol defined in a source file (e.g., a P4 file). Continuing with this example, assuming some statistics are multi-layered or are based on different field values, user interface 500 can allow a user to "drill down" for statistics or more granular test details, e.g., based on one or more fields (e.g., fields in a protocol imported or derived from a SUT source code).

It will be appreciated that FIG. 5 is for illustrative purposes and that various aspects described above in relation to FIG. 5 may be changed, altered, added, or removed. For example, some user interface elements and/or features described in FIG. 5 may be removed or modified.

In some embodiments, test system 100, CE 104, or another entity may analyze source code from SUT 106 or a related DUT. In such embodiments, test system 100, CE 104, or another entity may detect or identify code portions, such as portion 602, that relate to some functionality of SUT 106 and determine how to generate related source code (or modify existing or predefined source code) to program and/or configure at least one test system resource (e.g., TE 112 or RE 114) for testing the functionality of SUT 106.

FIG. 6 is a diagram 600 that illustrates code portions 602-604 associated with testing header stacks. In some embodiments, test system 100, CE 104, or another entity may be configured to identify corner values (e.g., maximum values or minimum values supported for various features) and may generate and/or modify source code and/or related configuration data (e.g., test plans) that attempt to subvert (e.g., exceed) those corner values.

Referring to FIG. 6, diagram 600 may include an original code portion 602 and a modified or derived code portion 604. Code portion 602 may represent a portion of P4 code for parsing multiprotocol label switching (MPLS) packet header stacks at SUT 106. For example, code portion 602 may define a maximum supported MLPS depth 606 for SUT 106 and may define parser actions for MPLS header data at SUT 106.

Code portion 604 may represent a portion of P4 code for testing the parsing of MLPS header stacks at SUT 106. For example, code portion 604 may define a multiprotocol label switching (MPLS) depth 608 that is different (e.g., higher) than the MPLS depth supported by SUT 106. In this example, using code portion 604 and/or other configuration data, TE 112 or another test system resource may be configured to generate and send test packets that exceed the MLPS depth supported by SUT 106. Continuing with this example, test system 100 and/or related entities may then monitor how SUT 106 handles these test packets.

It will be appreciated that FIG. 6 is for illustrative purposes and that various aspects described above in relation to FIG. 6 may be changed, altered, added, or removed. Further, while code portions 602-604 above relate to parsing it will be appreciated that additional source code (e.g., P4 code and/or other types of source code) for performing other actions related to handling test traffic may be modified or generated using code portion 602 and/or other code associated with SUT 106. For example, test system 100, CE 104, or another entity may use code portion 602 and/or other code to generate a new table and/or other mechanisms for allowing TC 102 to programmatically insert a fourth MPLS label header on demand to perform a negative test.

FIG. 7 is a diagram 700 illustrating code portions 702-704 associated with instrumentation parser states. In some embodiments, test system 100, CE 104, or another entity may be configured to generate configuration source code and/or other configuration data for configuring test system resources. In such embodiments, the test system resources may be configured to instrument test packets for obtaining test results and/or monitoring test performance. For example, various test system resources (e.g., TE 112 and/or RE 114) may need to be configured to read, write, and/or modify instrumentation data (e.g., timestamps, digital signatures, sequence numbers, etc.) stored in one or more test packets sent during a test session or test plan.

In some embodiments, instrumentation data may be inserted or encoded into test packets by test system 100, TE 112, or another entity. For example, during transmission, instrumentation data may be encoded into the "payload" portion of one or more test packets. In this example, the instrumentation data may be appended after the last header which is expected to appear in normal traffic, e.g., as defined by code portion 702.

Referring to FIG. 7, diagram 700 may include an original code portion 602 and a modified or derived code portion 704. Code portion 702 may represent a portion of P4 code for handling packets at SUT 106. For example, code portion 702 may indicate when 'ingress' states are to occur. In this example, an 'ingress' state may represent a special state, also referred to as a terminal state, which causes packet parsing to cease or end and match-action processing to begin.

Code portion 704 may represent a portion of P4 code for determining whether a packet has instrumentation data. For example, code portion 704 may define a new parse state (e.g., a 'scan_for_signature' state which looks for a special signature after the end of the last expected header. In this example, CE 104 or another entity may analyze code portion 702 and/or other source code to determine the appropriate code locations to insert the new parse state. Continuing with this example, CE 104 or another entity may determine to modify code portion 702 by substituting the 'scan_for_signature' state in place of the 'ingress' state.

In some embodiments, a 'scan_for_signature' state may include code for detecting whether a packet includes a signature or data pattern (e.g., a 32-bit or 96-bit data portion) indicating that a packet or related payload includes instrumentation data. If the signature is detected, then instrumentation data may be extracted. If the signature is not detected, instrumentation data is not extracted (and the packet is not regarded as being instrumented) In some embodiments, a 'scan_for_signature' state may in due course trigger an 'ingress' state so that packet parsing can end and match-action processing can begin.

It will be appreciated that FIG. 7 is for illustrative purposes and that various aspects described above in relation to FIG. 7 may be changed, altered, added, or removed. Further, while code portions 702-704 above relate to parsing it will be appreciated that additional source code (e.g., P4 code and/or other types of source code) for performing other actions related to handling test traffic may be modified or generated using code portion 702 and/or other code associated with SUT 106.

FIG. 8 is a diagram 800 illustrating code portions 802-804 supporting instrumentation header data and parser states. Referring to FIG. 8, diagram 800 includes a code portion 802 for defining headers associated with instrumentation and a code portion for defining instrumentation states.

Code portion 802 indicates that an instrument signature header type includes a signature field of 32 bits, that an instrument header type includes a 'flow_id' field of 16 bits, a 'sequence_number' field of 32 bits, and a 'timestamp' field of 32 bits. Code portion 802 also declares instances of an instrument signature header and an instrument header.

Code portion 804 defines a 'scan_for_signature' parse state that looks for a defined 32-bit signature in a packet payload and, if found, extracts instrumentation data and then proceeds to an 'ingress' state. Code portion 804 also defines an 'extract instrumentation' parse state that first extracts the signature, then extracts the instrumentation data, and then enters the 'ingress' state.

In some embodiments, test system 100 or test system resources may be configured to read, write, and/or modify instrumentation data associated with test packets. For example, when generating test packets for testing SUT 106, TE 112 may configured to insert instrumentation data in at least some test packets. In this example, the instrumentation data may include timestamps, sequence numbers, flow-tracking ID, etc. In another example, when receiving test packets or responses associated with test packets, RE 114 may be configured to read and process received instrumentation data and analyze it. In this example, the instrumentation data may be analyzed for computing various metrics associated with latency, jitter, dropped and out-of-order packets, flow behavior, etc.

It will be appreciated that FIG. 8 is for illustrative purposes and that various aspects described above in relation to FIG. 8 may be changed, altered, added, or removed. Further, while code portions 802-804 above relate to parsing it will be appreciated that additional source code (e.g., P4 code and/or other types of source code) for performing other actions related to handling test traffic may be utilized.

Figure 9:
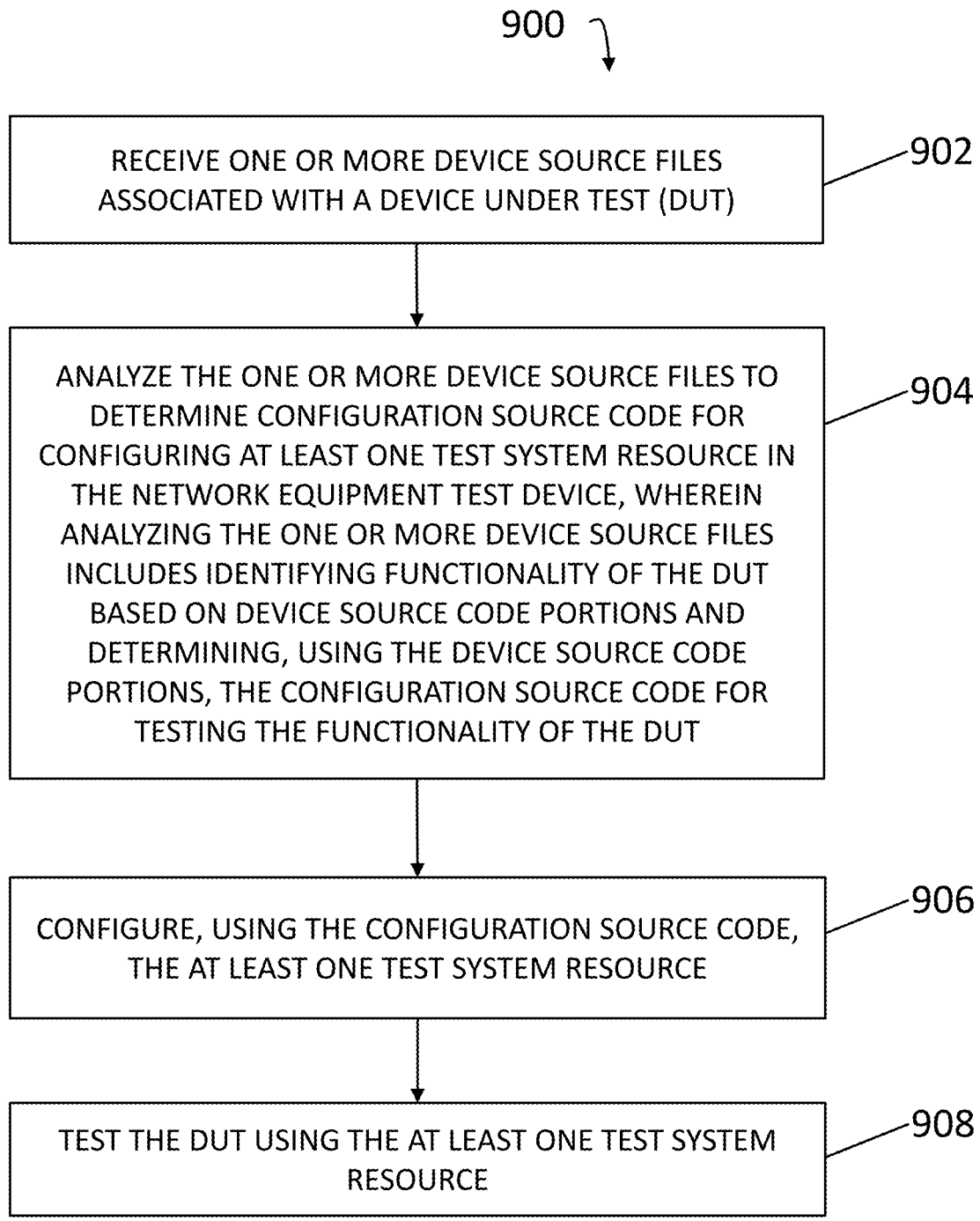
FIG. 9 is a diagram illustrating an example process for configuring a test system using source code of a device being tested.

FIG. 9 is a diagram illustrating an example process 900 for configuring a test system using source code of a device being tested. In some embodiments, example process 900, or portions thereof, may be performed by or at test system 100 (e.g., a network equipment test device), TC 102, CE 104, and/or another node or module.

In step 902, one or more device source files associated with a DUT may be received. For example, test system 100 and/or CE 104 may receive one or more P4 source files that corresponds to logic implemented in SUT 106.

In some embodiments, one or more device source files may include P4 or other programming language source code. In some embodiments, a DUT may include a network node, a router, a switch, a network interface card, a programmable network device, or an ASIC.

In step 904, the one or more device source files may be analyzed to determine configuration source code for configuring at least one test system resource in the network equipment test device, wherein analyzing the one or more device source files may include identifying functionality of the DUT based on device source code portions and determining, using the device source code portions, the configuration source code for testing the functionality of the DUT. For example, test system 100 and/or CE 104 may analyze a code portion to identify a MPLS depth 606 supported by SUT 106 and may use this code to generate or modify a code portion for testing a higher MPLS depth 608.

In some embodiments, at least one test system resource may include a packet generator, a transmit engine, or a receive engine. For example, test system 100 may configure TE 112 and/or RE 114 using configuration source code derived from source code associated with SUT 106.

In some embodiments, configuration source code may include P4 source code and/or non-P4 source code. For example, test system 100 and/or CE 104 may analyze device source code associated with SUT 106 and may use that analysis to generate P4 source code for a P4 programmable TE 112 and/or may use that analysis to generate non-P4 source-code for a programmable dataplane using non-P4-based technologies and/or may use that analysis to generate non-P4 source code (e.g., Java or C++ code) for a software-based packet generator.

In some embodiments, analyzing one or more device source files to determine the configuration source code may include generating code that supports header stacks that may be larger than header stacks supported by the DUT, generating code that supports parser graph paths that may be invalid or not supported by the DUT, generating code that implements counter-based, register-based or table-based state machines for testing possible input packets supported by the DUT, generating code that supports one or more parser states to handle instrumentation packet headers, or modifying predefined code portions to interact with custom code for testing the DUT.

In some embodiments, predefined code portions may include code for packet stream modification, code for packet instrumentation, code for supporting statistical counters, code for tracking end-to-end testing, code for detecting dropped and out-of-order packet delivery, or code for detecting data corruption.

In step 906, the at least one test system resource may be configured using the configuration source code. For example, test system 100 and/or CE 104 may send configuration data, e.g., logic or machine code, to TE 112. In this example, the logic may include P4-based logic for implementing a data plane of TE 112.

In some embodiments, analyzing one or more device source files may include generating at least one test plan for testing the DUT and wherein configuring the at least one test system resource may include providing the at least one test plan to the at least one test system resource. For example, a test plan or test case may include instructions and/or related data (e.g., packet header data) for performing a particular test or series of tests.

In step 908, the DUT may be tested using the at least one test system resource. For example, after being configured using source code associated with SUT 106, TE 112 may generate and send test packets to SUT 106 for testing functionality of SUT 106 based on the source code associated with SUT 106.

In some embodiments, a network equipment test device includes a source code compiler, wherein the source code compiler converts source code in configuration source code into logic for implementing a data plane of at least one test system resource, wherein the source code compiler sends the logic to the at least one test system resource for execution.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for configuring a test system using source code of a device being tested, the method comprising:
at a network equipment test device:
receiving one or more device source files associated with a device under test (DUT);
analyzing the one or more device source files to determine configuration source code for configuring at least one test system resource in the network equipment test device, wherein analyzing the one or more device source files includes identifying functionality of the DUT based on device source code portions and determining, using the device source code portions, the configuration source code for testing the functionality of the DUT, wherein analyzing the one or more device source files to determine the configuration source code includes generating code that supports header stacks that are larger than header stacks supported by the DUT, generating code that supports parser graph paths that are invalid or not supported by the DUT, generating code that implements counter-based, register-based or table-based state machines for testing possible input packets supported by the DUT, generating code that supports one or more parser states to handle instrumentation packet headers, or modifying predefined code portions to interact with custom code for testing the DUT;
configuring, using the configuration source code, the at least one test system resource; and
testing the DUT using the at least one test system resource, wherein the network equipment test device includes a source code compiler, wherein the source code compiler converts source code in the configuration source code into logic for implementing a data plane of the at least one test system resource, wherein the source code compiler sends the logic to the at least one test system resource for execution.

2. The method of claim 1 wherein the one or more device source files include P4 or other programming language source code.

3. The method of claim 1 wherein the DUT includes a network node, a router, a switch, a network interface card, a programmable network device, a central processing unit (CPU), a network processor, a field programmable gate array (FPGA), or an application specific integrated circuit (ASIC).

4. The method of claim 1 wherein the at least one test system resource includes a packet generator, a transmit engine, or a receive engine.

5. The method of claim 1 where analyzing the one or more device source files includes generating at least one test plan for testing the DUT and wherein configuring the at least one test system resource includes providing the at least one test plan to the at least one test system resource.

6. The method of claim 1 wherein the predefined code portions include code for packet stream modification, code for packet instrumentation, code for supporting statistical counters, code for tracking end-to-end testing, code for detecting dropped and out-of-order packet delivery, or code for detecting data corruption.

7. The method of claim 1 wherein the configuration source code includes P4 source code and/or non-P4 source code.

8. A system for configuring a test system using source code of a device being tested, the system comprising:
at least one processor;
at least one memory; and
a network equipment test device implemented using the at least one processor and the at least one memory, wherein the network equipment test device is configured for:
receiving one or more device source files associated with a device under test (DUT);
analyzing the one or more device source files to determine configuration source code for configuring at least one test system resource in the network equipment test device, wherein analyzing the one or more device source files includes identifying functionality of the DUT based on device source code portions and determining, using the device source code portions, the configuration source code for testing the functionality of the DUT, wherein analyzing the one or more device source files to determine the configuration source code includes generating code that supports header stacks that are larger than header stacks supported by the DUT, generating code that supports parser graph paths that are invalid or not supported by the DUT, generating code that implements counter-based, register-based, or table-based state machines for testing possible input packets supported by the DUT, generating code that supports one or more parser states to handle instrumentation packet headers, or modifying predefined code portions to interact with custom code for testing the DUT;
configuring, using the configuration source code, the at least one test system resource; and
testing the DUT using the at least one test system resource, wherein the network equipment test device includes a source code compiler, wherein the source code compiler converts source code in the configuration source code into logic for implementing a data plane of the at least one test system resource, wherein the source code compiler sends the logic to the at least one test system resource for execution.

9. The system of claim 8 wherein the one or more device source files include P4 programming language or other programming source code.

10. The system of claim 8 wherein the DUT includes a network node, a router, a switch, a network interface card, a programmable network device, a central processing unit (CPU), a network processor, a field programmable gate array (FPGA), or an application specific integrated circuit (ASIC).

11. The system of claim 8 wherein the at least one test system resource includes a packet generator, a transmit engine, or a receive engine.

12. The system of claim 8 where analyzing the one or more device source files includes generating at least one test plan for testing the DUT and wherein configuring the at least one test system resource includes providing the at least one test plan to the at least one test system resource.

13. The system of claim 8 wherein the predefined code portions include code for packet stream modification, code for packet instrumentation, code for supporting statistical counters, code for tracking end-to-end testing, code for detecting dropped and out-of-order packet delivery, or code for detecting data corruption.

14. The system of claim 8 wherein the configuration source code includes P4 source code and/or non-P4 source code.

15. A non-transitory computer readable medium comprising computer executable instructions embodied in the computer readable medium that when executed by at least one processor of a computer perform steps comprising:

receiving one or more device source files associated with a device under test (DUT);

analyzing the one or more device source files to determine configuration source code for configuring at least one test system resource in a network equipment test device, wherein analyzing the one or more device source files includes identifying functionality of the DUT based on device source code portions and determining, using the device source code portions, the configuration source code for testing the functionality of the DUT, wherein analyzing the one or more device source files to determine the configuration source code includes generating code that supports header stacks that are larger than header stacks supported by the DUT, generating code that supports parser graph paths that are invalid or not supported by the DUT, generating code that implements counter-based, register-based, or table-based state machines for testing possible input packets supported by the DUT, generating code that supports one or more parser states to handle instrumentation packet headers, or modifying predefined code portions to interact with custom code for testing the DUT;

configuring, using the configuration source code, the at least one test system resource; and testing the DUT using the at least one test system resource, wherein the network equipment test device includes a source code compiler, wherein the source code compiler converts source code in the configuration source code into logic for implementing a data plane of the at least one test system resource, wherein the source code compiler sends the logic to the at least one test system resource for execution.

16. The non-transitory computer readable medium of claim 15 wherein the one or more device source files include P4 or other programming language source code.

* * * * *